United States Patent
Sikora et al.

(10) Patent No.: US 9,322,567 B2
(45) Date of Patent: Apr. 26, 2016

(54) MODULAR WALL MODULE PLATFORM FOR A BUILDING CONTROL SYSTEM

(71) Applicant: Honeywell International Inc., Morristown, NJ (US)

(72) Inventors: Lubos Sikora, Brno (CZ); Milan Kostelecky, Brno (CZ); Ondrej Ficner, Albrechtice (CZ); Cory Grabinger, Maple Grove, MN (US); William Bray, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 378 days.

(21) Appl. No.: 14/061,367

(22) Filed: Oct. 23, 2013

(65) Prior Publication Data

US 2015/0112456 A1    Apr. 23, 2015

(51) Int. Cl.
G05B 15/00 (2006.01)
F24F 11/00 (2006.01)
G05D 23/19 (2006.01)

(52) U.S. Cl.
CPC ........... *F24F 11/0086* (2013.01); *F24F 11/001* (2013.01); *F24F 11/0012* (2013.01); *F24F 11/0015* (2013.01); *F24F 11/0034* (2013.01); *G05D 23/1902* (2013.01); *F24F 2011/0091* (2013.01)

(58) Field of Classification Search
CPC ........... F24F 11/0086; G05D 23/1902; G06F 3/0488; G06F 3/0202
USPC .......................... 700/83; 710/8, 14, 62, 72, 73
See application file for complete search history.

(56) References Cited

U.S. PATENT DOCUMENTS

| | | | |
|---|---|---|---|
| 6,796,187 B2 | 9/2004 | Srinivasan et al. | |
| 6,798,341 B1 | 9/2004 | Eckel et al. | |
| 7,028,912 B1 * | 4/2006 | Rosen | G06F 3/0488 236/1 C |
| 7,490,769 B2 | 2/2009 | Hall | |
| 8,265,797 B2 | 9/2012 | Nickerson et al. | |

(Continued)

FOREIGN PATENT DOCUMENTS

WO    2008097992    8/2008

OTHER PUBLICATIONS www.johnsoncontrols.com/content/us/en/products/building_efficiency/commercial-refrigeration/system-modular-control-system450.html, "Modular Electronic Control Systems," 2 pages, printed Apr. 1, 2013.

(Continued)

*Primary Examiner* — Sean Shechtman
*Assistant Examiner* — Sivalingam Sivanesan
(74) *Attorney, Agent, or Firm* — Seager, Tufte & Wickhem, LLP

(57) ABSTRACT

A wall module for use with a building control system is customizable for a particular application though the selection of different overlays, displays, and/or expansion modules. The selected overlay and the display, when provided, together may form the user interface of the desired wall module configuration. The expansion module may be selected to provide additional desired functionality. Different overlays, displays and/or expansion modules may be selected for different wall modules within a building control system.

19 Claims, 19 Drawing Sheets

(56) References Cited

U.S. PATENT DOCUMENTS

| | | | |
|---|---|---|---|
| 8,538,588 B2* | 9/2013 | Kasper | G05D 23/19 700/276 |
| 2008/0094210 A1 | 4/2008 | Paradiso et al. | |
| 2009/0158188 A1* | 6/2009 | Bray | F24F 11/001 715/771 |
| 2010/0100829 A1* | 4/2010 | Laberge | F24F 11/0012 715/762 |
| 2011/0095994 A1* | 4/2011 | Birnbaum | G06F 3/03547 345/173 |
| 2012/0221149 A1 | 8/2012 | Kasper | |
| 2013/0346636 A1* | 12/2013 | Bathiche | G06F 13/102 710/8 |

OTHER PUBLICATIONS www.ge-mcs.com/en/co2/wall-mount/ventostat-8000-series.html, "Ventostat 8000 Series," 4 pages, printed Apr. 1, 2013.

Delta Controls, "Entelitouch," 2 pages, downloaded Apr. 1, 2013.

Honeywell, "Zio LCD Wall Modules TR70 and TR70-H with Sylk Bus, Operating Guide," 28 pages, 2008.

Honeywell, "Zio/Zio Plus LCD Wall Modules TR70, TR71 and TR75 Models with Sylk Bus, Installation Instructions," 4 pages, Jan. 2012.

Honeywell, "Zio/Zio Plus LCD Wall Modules TR70, TR71 and TR75 Models with Sylk Bus, Specification Data," 4 pages, Dec. 2011.

Johnson Controls, "System 450 Modular Electronic Controls, Clear and Simple Control," 4 pages, 2010.

Penn by Johnson Controls, "System 450 Modular Controls," Code No. LIT-1900549, 8 pages, issued Jul. 24, 2012.

Penn by Johnson Controls, "System 450 Modular Controls, Technical Bulletin," Code No. LIT-23022569, pp. 1-116, issued Jul. 24, 2012.

* cited by examiner

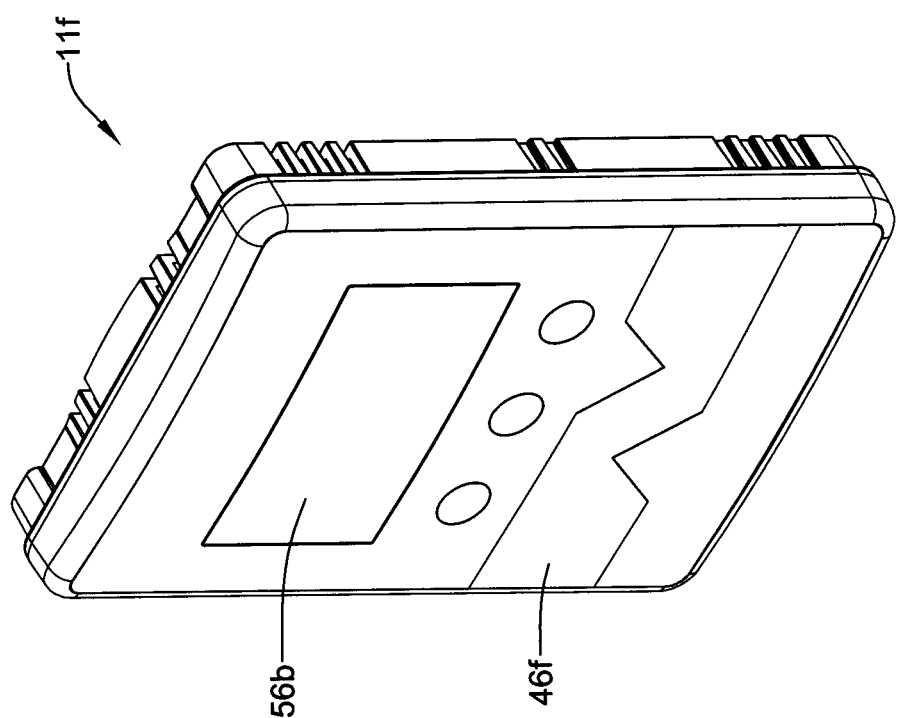

MODULAR WALL MODULE PLATFORM FOR A BUILDING CONTROL SYSTEM

RELATED APPLICATION

This application is related to U.S. Published Application No. 2012/0221149 entitled "METHOD AND APPARATUS FOR CONFIGURING SCHEDULING ON A WALL MODULE" which is incorporated herein by reference in its entirety for all purposes.

TECHNICAL FIELD

The present disclosure relates generally to wall modules that may be utilized in connection with a building control system, and more particularly to a wall module platform that may be configured for use in multiple applications or settings.

BACKGROUND

Building automation systems (BAS) are often used to help control certain systems of a building, such as HVAC, lighting, security, and other systems of a building. In many applications, information and/or parameters related to the building systems are displayed to the users of the building via one or more wall modules located at different locations and/or zones within the building. The information and/or parameters that are to be sensed, displayed, manipulated and/or controlled via any particular wall module may vary depending on, for example, the particular building system(s) to be controlled, the particular installation, the location of the wall module within the building, etc. To accommodate this variety, different wall module configurations are often produced and stocked. However, designing, building and stocking a wide variety of wall modules can be expensive and inefficient.

SUMMARY

The present disclosure relates generally to wall modules that may be utilized in connection with a building control system, and more particularly to a wall module platform that may be configured for use in multiple applications or settings. In one example, a wall module may include a housing including a cover and a base, a port for communicating control signals, and a user interface. The user interface may include an overlay secured to the cover of the housing. The overlay may include an overlay configuration that has one or more touch sensitive regions for accepting an input from a user. A controller may be disposed within the housing and operatively coupled to the port and the user interface. The controller may be configured to detect an overlay configuration of the user interface from two or more different overlay configurations, and may be configured to change the controller's behavior based on the detected overlay configuration. In some instances, the wall module may include a removable sensor module that includes a sensor configuration. The controller may be configured to detect the particular sensor configuration of the sensor module from two or more different sensor configurations, and change the controller's behavior based on the detected sensor configuration. In some instances, the wall module may further include a display. The cover may include a window that exposing at least part of the display. The controller may be configured to alter the information that is displayed on the display based, at least in part, on the detected overlay configuration and/or the detected sensor configuration.

In another example a method of assembling a wall module may include coupling a main circuit board to a housing, wherein the main circuit board has a controller. An overlay may then be selected from at least a first overlay and a second overlay, wherein the first overlay includes one or more touch-sensitive regions in a first configuration and the second overlay includes one or more touch-sensitive regions in a second configuration, wherein the first configuration differs from the second configuration. The selected overlay may then be mounted to a surface of the housing. The selected overlay may then be electrically connected to the main circuit board. A sensor module may be selected from at least a first sensor module and a second sensor module. The first sensor module may include a first sensor configuration and the second sensor module may include a second sensor configuration, wherein the first sensor configuration differs from the second sensor configuration. The selected sensor module may be electrically connected to the main circuit board, wherein the controller of the main circuit board receives input from the selected overlay and the selected sensor module.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which:

FIGS. 7A-7G show several example wall modules having different overlays;

Figure 1:
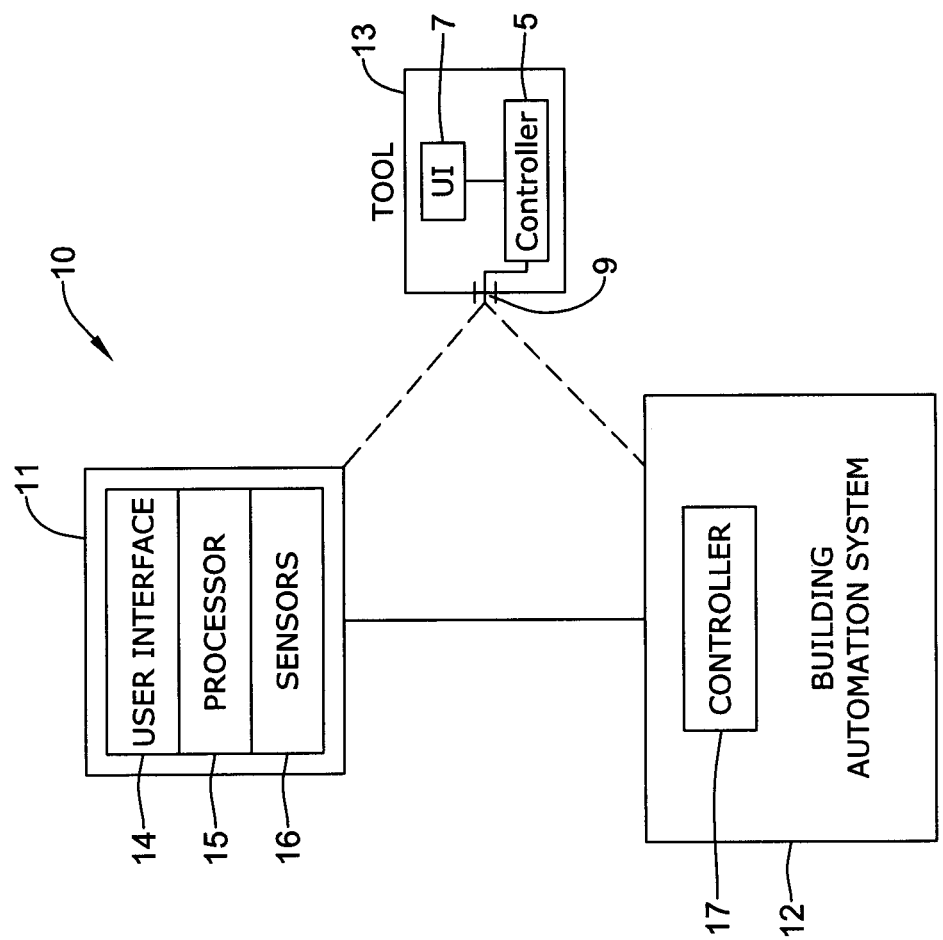
FIG. 1 is a schematic diagram of an illustrative system that includes a wall module in communication with a building automation system.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to illustrative in nature.

FIG. 1 is a schematic diagram of an illustrative system 10 that includes a programmable wall module 11 in communication with a building automation system (BAS) 12. The BAS 12 may control one or more of heating, ventilation and air conditioning (HVAC), lighting, security, fire, and/or other building system components. The BAS 12 may be configured to monitor and/or control one or more physical properties of the building, such as temperature, humidity, ventilation, building access, lighting, fire detection and/or fire suppression, etc. Exemplary HVAC building components may include, for example, dampers, valves, sensors, air conditioning units, heating units (i.e. boilers, furnaces, etc.), and ventilators. Exemplary security building components may include detectors (i.e. motion, fire, smoke, glass, etc.), alarms, cameras, and security lights. Exemplary lighting building components may include timers, occupancy sensors, and light fixtures. Exemplary fire building components may include detectors (i.e. smoke, heat, air quality, etc.), alarms, and sprinklers. While the BAS 12 may include multiple systems, for simplicity, the following description will be described with reference to HVAC systems and HVAC system components. However, it is to be understood that the following features may be used in combination with lighting systems, security systems, fire systems, and/or other building systems, as desired.

In some cases, as shown in FIG. 1, the BAS 12 may also include a controller 17 configured to, for example, control a particular piece or group of equipment, control a function, and/or control a region of the building. Controller 17 may be, for example, a specific purpose-built computer with input and output capabilities. Such controllers may come in a range of sizes and capabilities to control devices commonly found in buildings, and/or to control sub-networks of controllers. The controller inputs may receive input signals (e.g. temperatures, humidity, pressure, current flow, air flow, set points, schedules, etc.) and the controller outputs may provide control signals or commands to other devices or to other parts of the system. The controller inputs and outputs may be either digital or analog signals, or a combination thereof In one illustrative embodiment, the controller 17 may be, or may include, an HVAC controller configured to control the comfort level of the building or structure by activating and deactivating one or more HVAC components. Exemplary HVAC functions that may be controlled by HVAC controller may include, for example, temperature setpoints, humidity setpoints, set point schedules, trend logs, timers, environment sensing, and/or other HVAC functions, as desired. In some cases, the HVAC controller 17 may be a thermostat, such as a wall mounted thermostat, but this is not required. In other cases, the HVAC controller 17 may be a zone controller configured to control a certain portion of the building. In yet other cases, the HVAC controller 17 may receive instructions (e.g. call for heat) from a wall module 11, and may control the HVAC equipment (e.g. furnace) accordingly. Other suitable HVAC controllers may be employed, as desired.

In the example shown in FIG. 1, the wall module 11 may serve as a user or installer interface to the HVAC system (or other systems) of the BAS 12 and, in some cases, may be a programmable wall module. Users may include, for example, building occupants, building owners, building tenants, equipment installers and/or technicians. In some cases, the wall module 11 may be a modular wall module 11 that may facilitate a user in selecting a particular user interface and/or functional capabilities suitable for the user's application, as will be described in greater detail below, while at the same time maintaining an overall uniform design and look. Additionally, the wall module 11 may have the ability to be customized so that selected or customized controller parameters may be accessed and/or displayed at the wall module 11.

In some cases, the wall module 11 may be configured to access any number of variables or parameters of the controller 17 and the user/installer may be able to view and/or change these variables at the wall module 11. To do so, the wall module 11 can be in communication (wired or wirelessly) with the controller 17 to send and/or receive signals that corresponding to the parameters (e.g. schedule, set points, etc.). Specific customers and applications may be configured to provide different information and/or permissions according to the information that a user may prefer to see in the display of wall module 11. In some cases, the wall module 11 may be configurable to let the user or installer choose the information presented on the display and whether that information is viewable only or also modifiable. For example, the wall module 11 may be configured to display schedules, set points, temperatures (e.g. indoor, outdoor), humidity (e.g. indoor, outdoor), CO2 levels, occupancy, fan status, and/or other parameters of HVAC controller 17, as desired. In some cases, the wall module 11 may be wall mountable. While one wall module 11 is shown in FIG. 1, it is contemplated that any number of wall modules 11 may be used, such as two or more, three or more, four or more, five or more, six or more, seven or more, eight or more, or any other suitable number of wall modules, as desired.

As shown generally in FIG. 1, the wall module 11 may include a user interface 14, a controller or processor 15, and in some cases one or more sensors 16. In some cases, the one or more sensors 16 may include a temperature sensor, an occupancy or motion sensor, a humidity sensor, a ventilation sensor, an air quality sensor, a $CO_2$ sensor, a CO sensor, and/or any other suitable HVAC building control system sensor or combinations of sensors, as desired. The one or more sensors 16 may be included within a housing of the wall module 11 such as, for example shown in FIG. 2. However, in some cases, it is contemplated that one or more of the sensors 16 may be located remotely from the wall module 11.

The user interface 14, when provided, may be any suitable user interface that is configured to display and/or solicit information. In some cases, the user interface 14 may permit a user to enter data, make selections and/or make other settings, as desired. In some cases, the user interface 14 of the wall module 11 may allow a user to program and/or modify one or more parameters, such as programming schedules, set points, times, equipment status and/or other parameters, as desired. In some instances, the user interface 14 may include a display and one or more buttons. For example, the user interface may include a fixed segment display and one or more soft keys. However, other suitable user interfaces may be used, such as, a touch screen display, a liquid crystal display (LCD) panel and keypad, a dot matrix display, a light-emitting diode (LED) display, a computer, buttons and/or any other suitable interface, as desired. In some cases, the user interface 14 may include a LCD and optionally, one or more touch sensitive keys. The configuration of the keys and/or display may be selected according to the desired end use application. In other cases, the user interface 14 may be a remote user interface provided by a device that is separate and located remotely from the wall module 11. For example, the remote user interface 14 may be provided by an application program executed by a user's smart phone, tablet computer, or desktop computer.

The wall module controller or processor 15 may be configured to display and/or allow a user to configure the one or more parameters or settings of the controller 17 via one or more screens of the user interface 14, if provided. Exemplary parameters or setting may include temperature setpoints, humidity setpoints, operating schedules, trend logs, timers, environment sensing, controller programs, user preferences, and/or other controller settings. In some cases, the wall module 11 may include a memory (not shown) operatively coupled to the processor 15 to store the one or more parameter screens. In some cases, particular screens may be uploaded via the output port 9 of a configuration tool 13, along with the aforementioned HVAC schedules, temperature setpoints, humidity setpoints, trend logs, timers, environmental settings, and any other settings and/or information. The wall module 11 may store information within the memory and may subsequently retrieve the stored information. The memory may include any suitable type of memory, such as, for example, random-access memory (RAM), read-only member (ROM), electrically erasable programmable read-only memory (EEPROM), Flash memory, or any other suitable memory, as desired.

As shown in FIG. 1, a configuration tool 13 may be used to configure the wall module 11 via a wired and/or wireless connection, as shown by dashed lines. An exemplary configuration tool that may be used to configure the wall module 11 may be Tridium Inc.'s NIAGRA Workbench tool. This is just one example configuration tool. It is contemplated that other suitable tools for configuration the wall module 11 may be utilized. In some instances, the wall module 11 may be configured via the user interface 14 of the wall module 11, without any configuration tool 13.

The configuration tool 13, when provided, may include a controller 5, a user interface 7 that is controlled by the controller 5, and an output port 9 that is controlled by the controller 5. The configuration tool 13 may be used to, for example, setup, program, and/or configure the programmable wall module 11. In one example, the configuration tool 13 may be configured to define the parameters or other information that is to be displayed in one or more screens on the wall module 11, the format of how the parameters or other information are to be displayed on the screens of the wall module 11, and/or parameter permissions (read only, read and write, hide), etc. In some embodiments, the configuration tool 13 may be implemented in a general purpose computer, a workstation, a PDA, a smart phone, a handheld computer device, or any other suitable computing device, as desired.

In some cases, the output port 9 of the configuration tool 13 may accommodate a portable memory (such as a flash memory), which may be inserted into the output port 9, and one or more program modules for configuring the wall module 11 may be uploaded from the configuration tool 13 to the portable memory. The portable memory may then be removed from the output port 9 of the configuration tool 13 and inserted into a port of the wall module 11, and the one or more program modules for configuration the wall module 11 may be uploaded from the portable memory to the wall module 11 or the controller 17, as appropriate. In other cases, both the configuration tool 13 and the wall module 11 may be accessible to a user via computer network such as, for example, the internet. The user may use the configuration tool to select one or more program modules for configuring the wall module 11 specific to the desired application. The one or more program modules may then be delivered from the configuration tool 13 to the individual wall module 11 or modules over the network via a wired or wireless connection. In cases where there may be multiple wall modules 11 where at least two wall modules 11 serve different functions, the configuration tool 13 may be used to configure each wall module 11 specific to its selected function, and deliver the selected program modules to the selected wall module 11 over the network via a wired or wireless connection, if desired.

In some instances, all of the different available configurations of the wall module 11 may be loaded and stored in a memory of the wall module at the factory. Then, in the field, the user may select which configuration to implement. The selection may be accomplished via the user interface 14 of the wall module, via a configuration tool 13, or in any other suitable manner.

Figure 2:
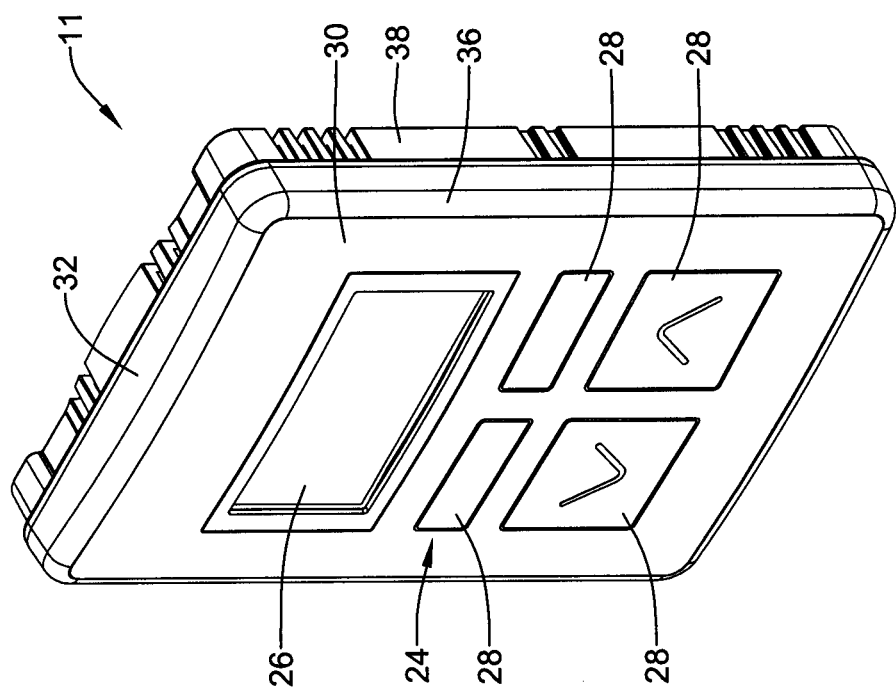
FIG. 2 is a front perspective view of an illustrative wall module.
Figure 3:
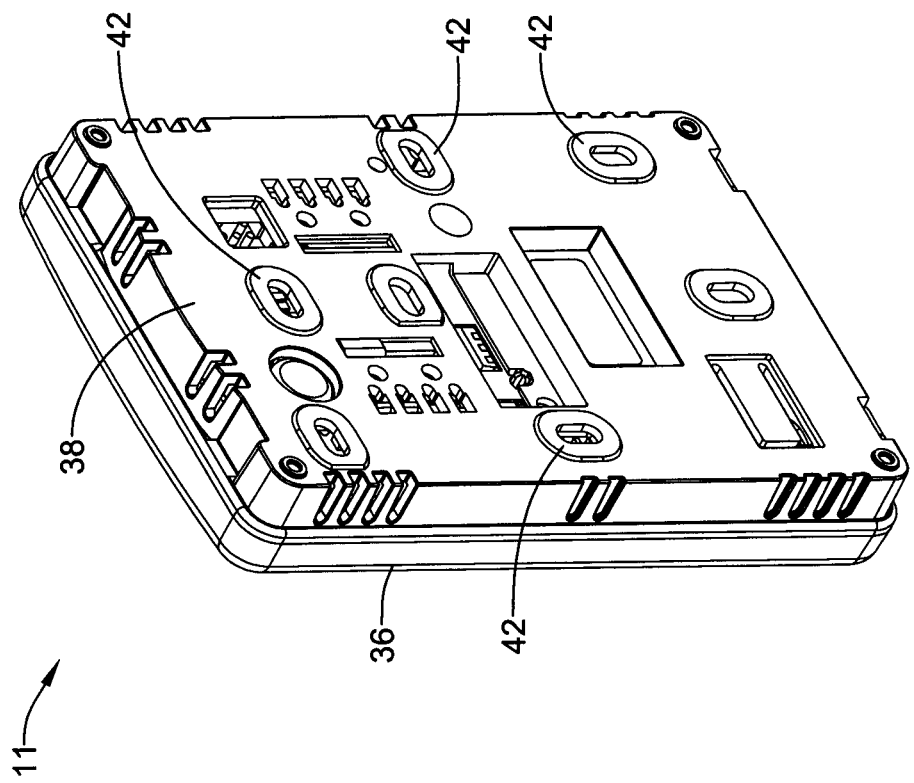
FIG. 3 is a back perspective view of the illustrative wall module shown in FIG. 2.

FIGS. 2 and 3 are front and back perspective views of an illustrative wall module 11 that may be used in connection with the BAS 12 shown in FIG. 1. As can be seen in FIGS. 2 and 3, the wall module 11 can include a user interface 24 having a display 26 and one or more optional keys 28 secured to an outer surface 30 of the housing 32. In some cases, the display 26 may be a liquid crystal display (LCD) and the key(s) 28 may be a touch sensitive, capacitive key(s), as will be described in greater detail below. Additionally, the size and/or configuration of the display 26 and the one or more keys 28 may be selected according to the desired end use application. The functionality of the display 26 and/or one or more keys 28 may be configured using the configuration tool 13 as described herein with reference to FIG. 1, or in any other suitable manner. While the embodiments described herein include a display 26 and/or one or more keys 28, embodiments in which there is no user interface located at the wall module 11 are also contemplated.

The thermoplastic housing 32 can include a cover 36 secured to a base 38. In some cases, the cover 36 may be removably coupled to the base 38, and may be secured to the base via one or more flexible locking tabs, but this is not required. The housing 32, including the cover 36 and the base 38, may be formed from a molded thermoplastic material. The base 38 may include one or more apertures 42 configured to receive a fastener there through or other mounting features for mounting and securing the base 38 to a surface such as, for example, a wall or ceiling. In some cases, the cover 36 may be secured to the base 38 after the base has been mounted to the surface of the building.

Figure 4:
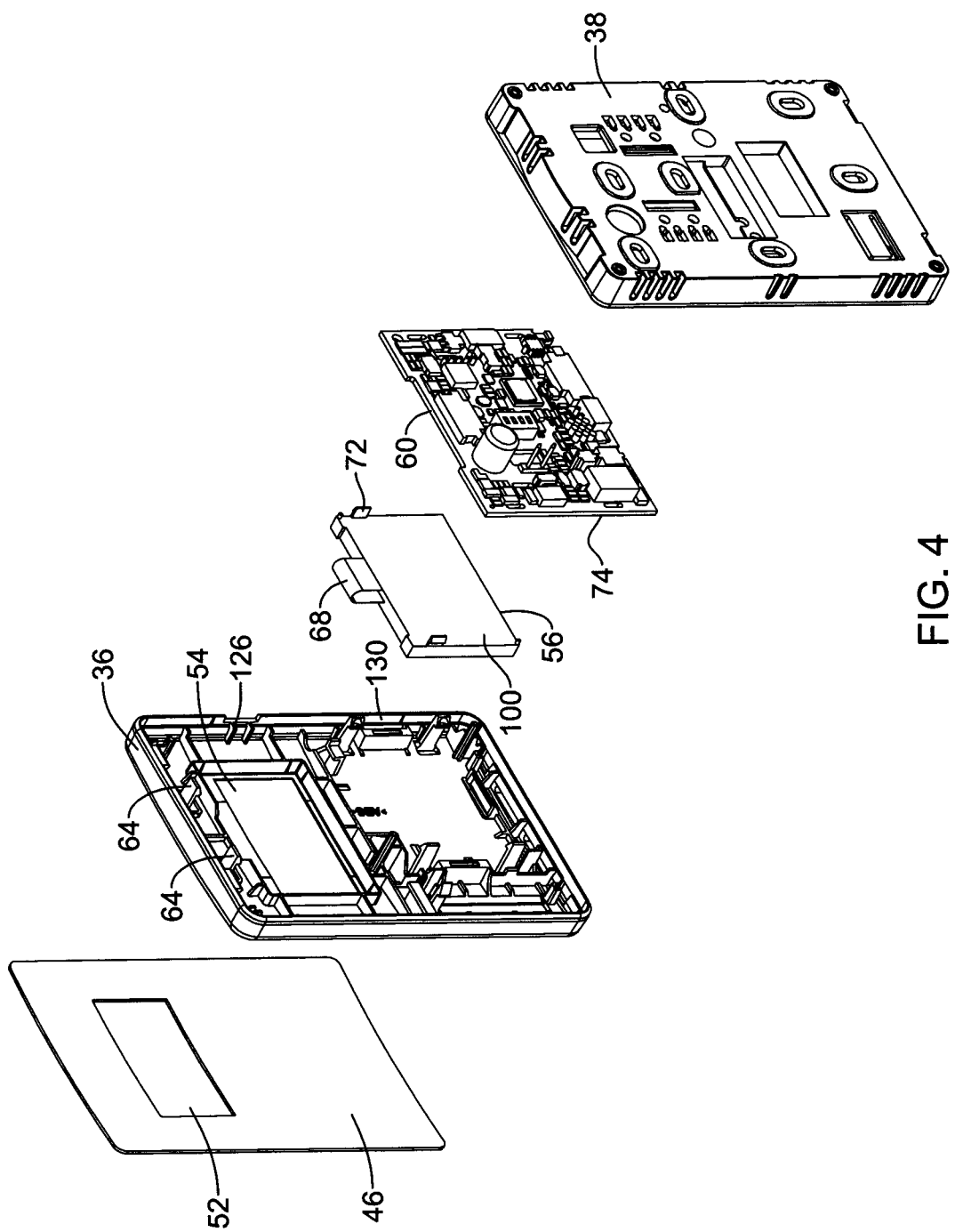
FIG. 4 is an exploded view of the illustrative wall module shown in FIGS. 2 and 3.

FIG. 4 is an exploded view of the wall module 11 shown in FIGS. 2 and 3 according to one illustrative embodiment. As shown in FIG. 4, the wall module 11 may include an overlay 46 including an optional window 52, a cover 36, an LCD 56, a main circuit board 60, and a base 38.

The overlay 46 may include an adhesive layer for adhering and securing the overlay 46 to the outer surface 30 of the housing 32. In some cases, as shown in FIG. 4, the overlay may include a window 52 having dimensions generally corresponding to the dimensions of the LCD 56 such that the LCD can be viewed and/or accessed by a user through the window 52 of the overlay. Additionally, the housing cover 36 may be selected such that it also include a window or opening 54 having dimensions corresponding to the dimensions of the selected LCD 56 such that the LCD may be accessed and/or viewed by a user through the overlay 46 and the housing cover 36. In some configurations, no display may be needed, and the window 52 in the overlay, the window 54 in the housing cover 36, and the LCD display 56 may be eliminated.

Depending upon the application, the overlay 46 may be selected such that it includes one or more touch sensitive keys, but this is not required in all embodiments. For example, the overlay 46 may include an up arrow key and a down arrow key and at least one additional soft key. In other configurations, the overlay may include a slider control and/or dial control button. In still other configurations, the overlay 46 may be selected such that it has no keys. These are just some examples in the diversity of possible overlays that might be available for selection.

The LCD 56, which provided, may be any suitable LCD 56 for displaying information and/or receiving interactions from a user, as applicable. The size and/or shape of the LCD 56 may be selected according to the desired end use application. For example, the LCD may be larger or smaller and/or maybe square, rectangular, oval, round or some other suitable shape for displaying information to the user. The LCD 56 may include an electrical connector such as, for example, a ribbon cable connector 68 for electrically coupling the LCD 56 to the main circuit board 60. Additionally, the LCD 56 may include one or more locking tabs 72 or other locking features for mounting and securing the LCD 56 to a front side 74 of the main circuit board 60. In many cases, the LCD 56 is secured to the front side 74 of the main circuit board 60 before the main circuit board 60 is secured to the housing cover 36 via the one or more locking tabs 64.

Figure 5A:
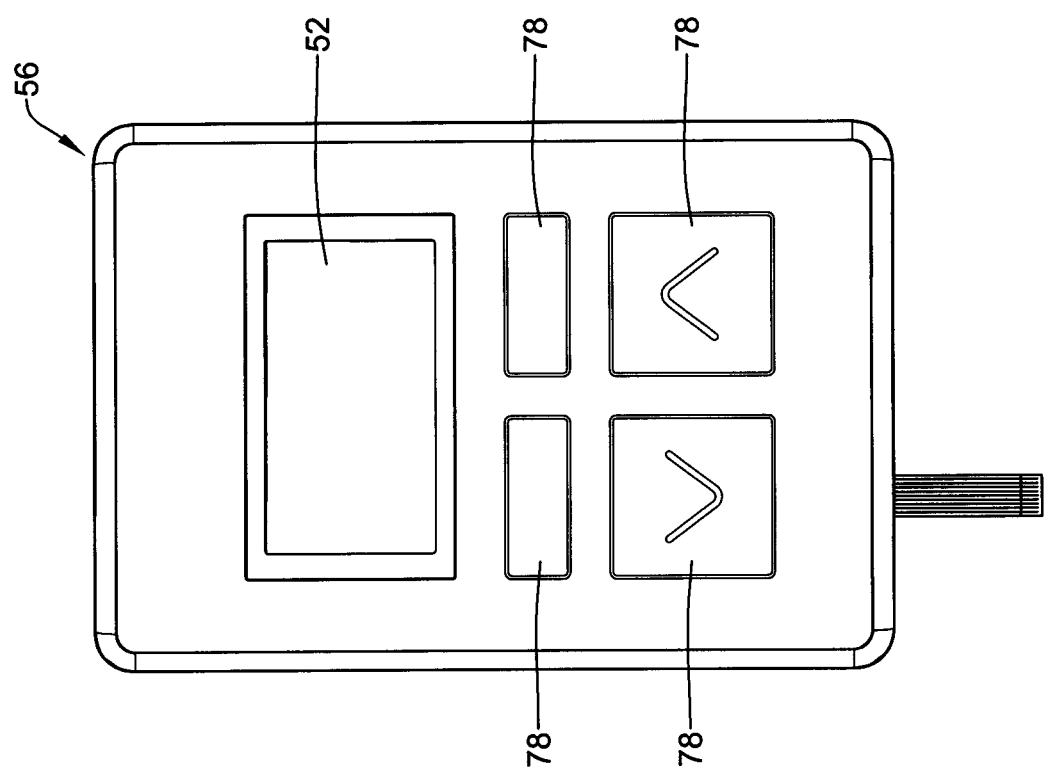
FIG. 5A is a front view of an illustrative overlay.
Figure 5B:
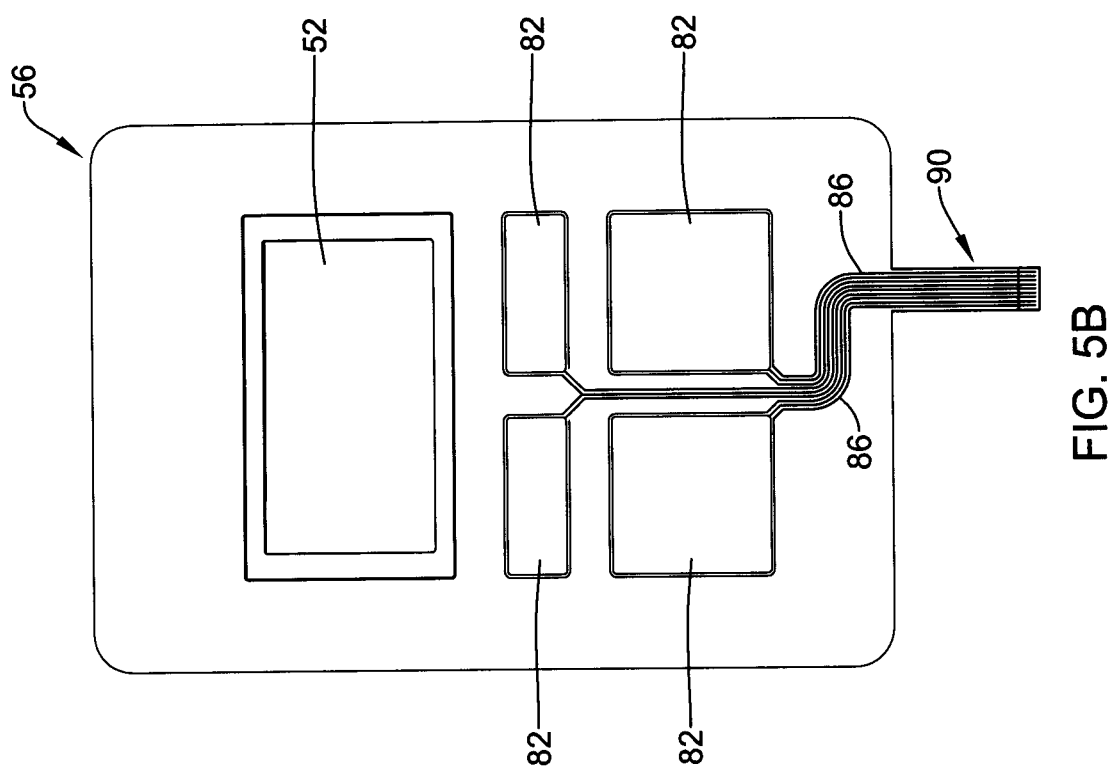
FIG. 5B is a back view of the illustrative overlay shown in FIG. 5A.

FIGS. 5A and 5B are front and back views, respectively, of an illustrative overlay 46. The configuration of the overlay 46 may be selected according to the desired end use application of the individual wall module 11 into which the overlay 46 may be incorporated to form at least part of the user interface 14. In some cases, as can be seen in FIGS. 5A and 5B, the overlay 46 may include an opening or window 52 that may generally correspond in shape and size to an LCD 56 that is selected for the same individual wall module 11. In addition, the overlay 46 may include one or more touch sensitive keys 78 that may be configured to receive one or more inputs from a user, and that together with the LCD 56 may form the user interface 14 of the wall module 11. The one or more touch sensitive keys 78 may include any one of an up arrow key and/or a down arrow key, a forward (right) arrow key, a back (left) arrow key, a slider control, a dial control, an/or any number of buttons, the functionality of which may depend upon the end use application. For example, the one or more touch sensitive keys 78 may be configured as a back button, a cancel button, a next button, a done button, an okay button, a help button and/or the like. These are just some examples of the different functionalities that may be assigned to the one or more touch sensitive keys 78 that form at least a portion of the user interface 14. In some cases, the overlay 46 may not include any touch sensitive keys 78, and may simply include the window 52 through which the LCD 56 may be viewed. In other cases, the overlay 46 may not include the window 52 and may simply include one or more touch sensitive keys 78 for accepting an input from a user. It will be generally understood that the configuration of the overlay 46 may include any combination of optional window 52 and/or one or more touch sensitive keys 78. The configuration of the overlay 46 may be selected according to the desired end use application of the wall module 11.

In some cases, the one or more touch sensitive keys 78 may utilize capacitive sensing technology and may be formed and defined by one or more capacitive circuits 82 imprinted on the overlay 46, as shown in FIG. 5B. Each of the one or more capacitive circuits 82 may have a lead conductive trace 86, which together may define a ribbon cable connector 90 for coupling the selected overlay 46 to the main circuit board 60.

In some cases, the ribbon cable connector 90 may be coupled to the main circuit board 60 after the overlay 46 has been secured to an outer surface 30 of the housing cover 36.

Figure 6:
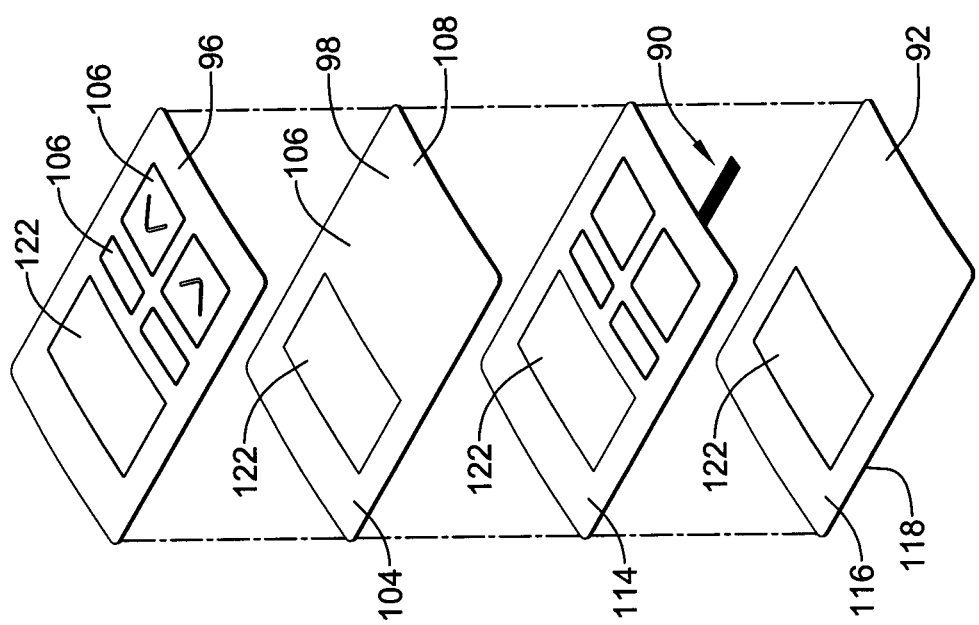
FIG. 6 is an exploded view of the illustrative overlay shown in FIGS. 5A and 5B

FIG. 6 is an exploded view of the overlay 46 shown in FIGS. 5A and 5B. As can be seen in FIG. 6, the overlay 46 may be a multi-layered overlay 46. The overlay 46 can include two or more layers. In some cases, one of the layers may be an adhesive layer 92 for adhering the overlay 46 to an outer surface 30 of the housing cover 36. In many cases, the overlay 46 is at least 90% transparent, but this is not required.

In some cases, the overlay 46 may include a graphic overlay layer 96 adhered to and in contact with an upper surface 98 of a first adhesive layer 104. The graphic overlay layer 96 may be selected such that includes one or more graphics 106 corresponding to each and defining each of the one or more touch sensitive keys 78. The one or more graphics 106 may be printed or embossed on a flexible, transparent material forming the graphic overlay layer 96, and may represent any one of an up arrow key and/or a down arrow key, a forward (right) arrow key, a back (left) arrow key, a slider control, a dial control, an/or the like. In some cases, the one or more graphics 106 may include text (not shown) identifying the key or key function (e.g. Cool, Hot, Help, Back, Cancel, Next, Ok, etc.), but this is not required.

The first adhesive layer 104 may be fabricated from a double sided adhesive material. The double sided adhesive material used to fabricate the first adhesive layer 104 may include a first layer of adhesive formed on an upper surface of a substrate to provide an upper adhesive surface 106 and a second layer of an adhesive formed on provided on a lower surface of the substrate that is opposite the upper surface to provide a lower adhesive surface 108 such that the first adhesive layer is capable of adhering to a surface or object on both its upper and lower surfaces 106 and 108. For example, an upper surface 106 of the adhesive layer may be adhered to and in contact with a lower surface of the graphic overlay layer 96, as described above, and a lower surface 108 of the adhesive layer 104 may be adhered to and in contact with an upper surface 110 of a capacitive circuit layer 114.

In some cases, the capacitive circuit layer 114 may include one or more capacitive circuits 82 formed on a suitable non-conducive substrate. In some cases the one or more capacitive circuits 82 may be formed from tracks or traces etched from copper or other conductive metal sheets laminated onto the non-conductive substrate. This is just one example. It will be generally understood that a variety of fabrication techniques may be used to form the capacitive circuits. As discussed herein, each of the capacitive circuits 82 may define a corresponding touch sensitive key 78 provided on the user interface 14 of the wall module. The number of capacitive circuits 82 provided on the capacitive circuit layer 114 may be dependent upon the configuration of the user interface 14 selected for the wall module. For example, the capacitive circuit layer 114 may include at least one and up to twelve capacitive circuits depending upon the number of touch sensitive keys 78 selected for the user interface configuration. The arrangement and size of each circuit depends upon the arrangement, size and function of the touch sensitive keys 78 used to form at least part of the user interface 14 of the wall module 11. In some cases, where the user interface 14 include s a display only, the capacitive circuit layer 114 may be absent from the overlay 46.

In some cases, as shown in FIG. 6, the overlay 46 may also include a second adhesive 92. The second adhesive layer 92 may be used to secure the overlay 46 to an outer surface 30 of the housing cover 36. Like the first adhesive layer 104, discussed above, the second adhesive layer 92 may be fabricated from a double sided adhesive material. The double sided adhesive material used to fabricate the second adhesive layer may include a first layer of adhesive formed on an upper surface of a substrate to provide an upper adhesive surface 1116 and a second layer of an adhesive formed on provided on a lower surface of the substrate that is opposite the upper surface to provide a lower adhesive surface 118 such that the second adhesive layer is capable of adhering to a surface or object on both its upper and lower surfaces 106 and 108. For example, an upper surface 116 of the second adhesive layer 92 may be adhered to and in contact with a lower surface of the capacitive circuit layer 114 and the outer surface 30 of the housing cover 32 of the wall module housing 36.

In some cases, if the user interface 14 includes a display 56, then each of the different layers of the overlay 46 may include a window or opening 122. The window or opening 122 may have dimensions generally corresponding to the window or opening 54 in the housing cover 36 and/or the display 56. In some cases, the window or opening 122 may have dimensions that are slightly greater than the dimensions of the opening in the housing cover that accommodate the display such that the window or opening 122 surrounds or frames the display when the overlay 46 is adhered to an outer surface 30 of the housing 36.

Additionally, the multi-layered overlay 39 may be formed such that when each of the different layers 92, 96, 104, and 113 are adhered together to form the multi-layered overlay, and the overlay is secured to the housing, the ribbon cable connector 90 formed by the lead conductive traces 86 extends from the overlay 46 such that it is available for connection to the main circuit board 60 located within the housing 36.

Figure 7A:
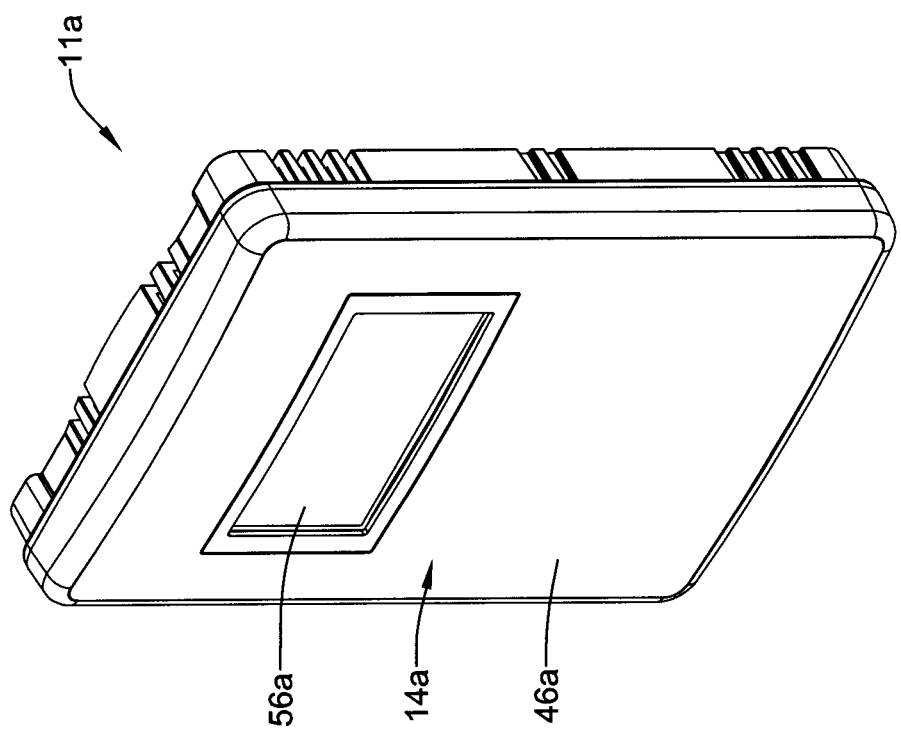
Figure 7B:
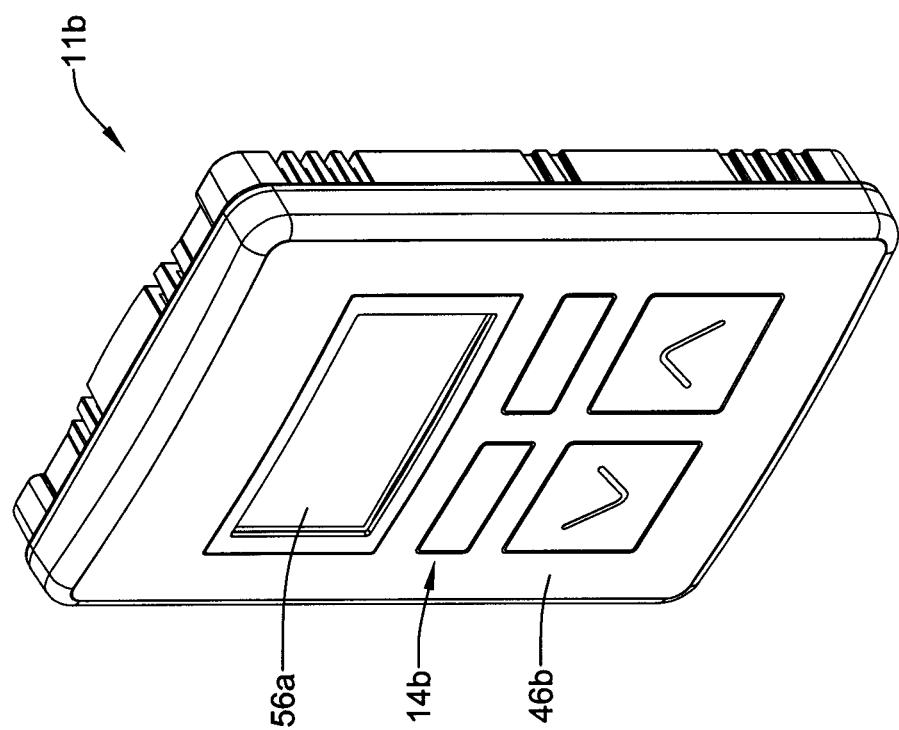
Figure 7C:
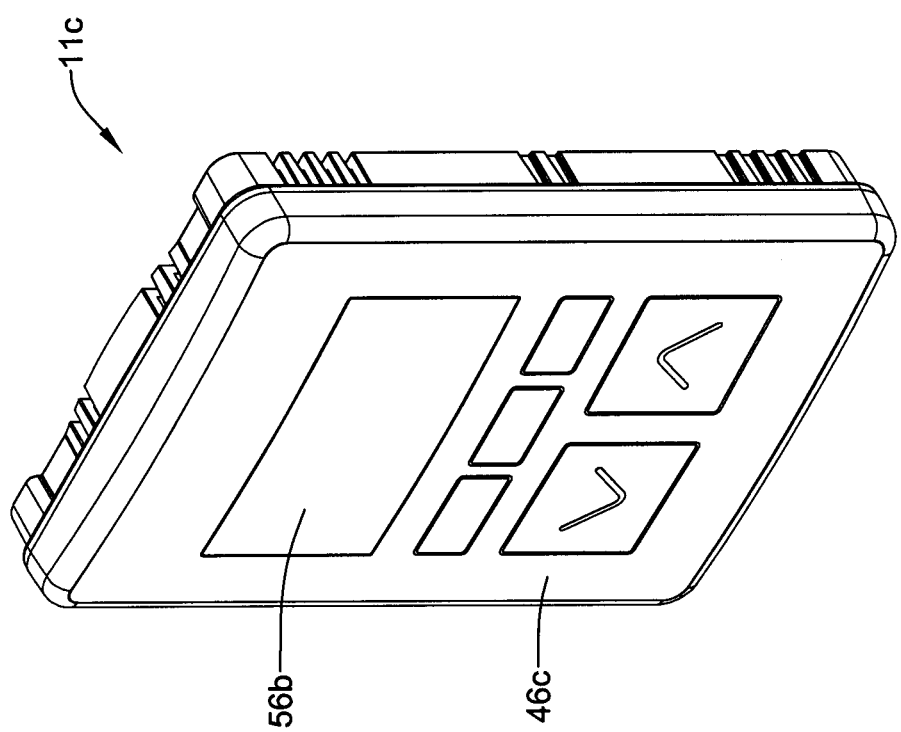
Figure 7D:
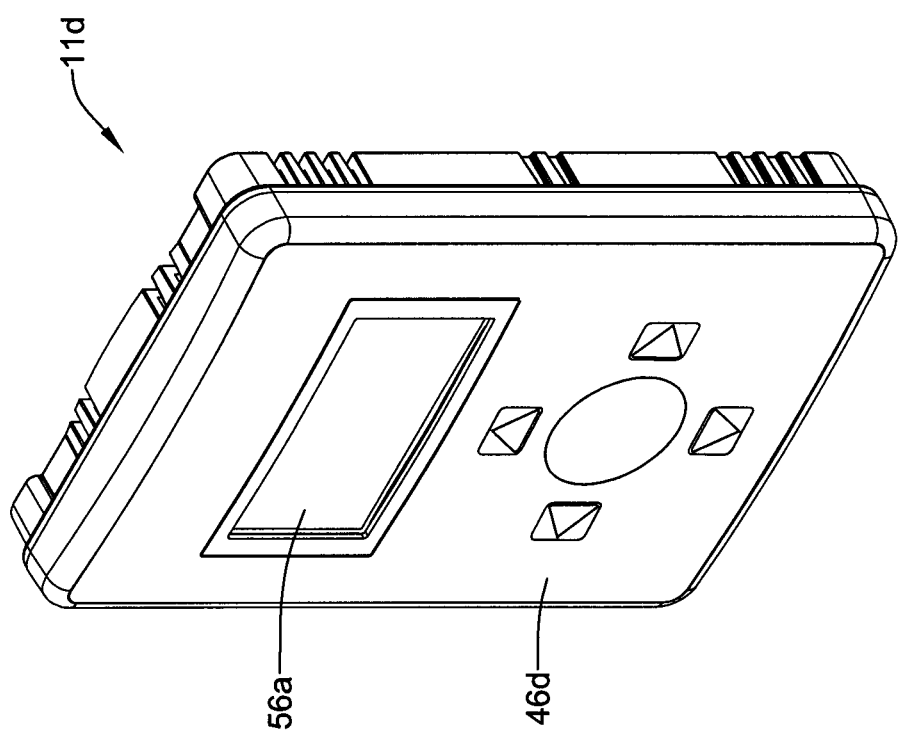
Figure 7E:
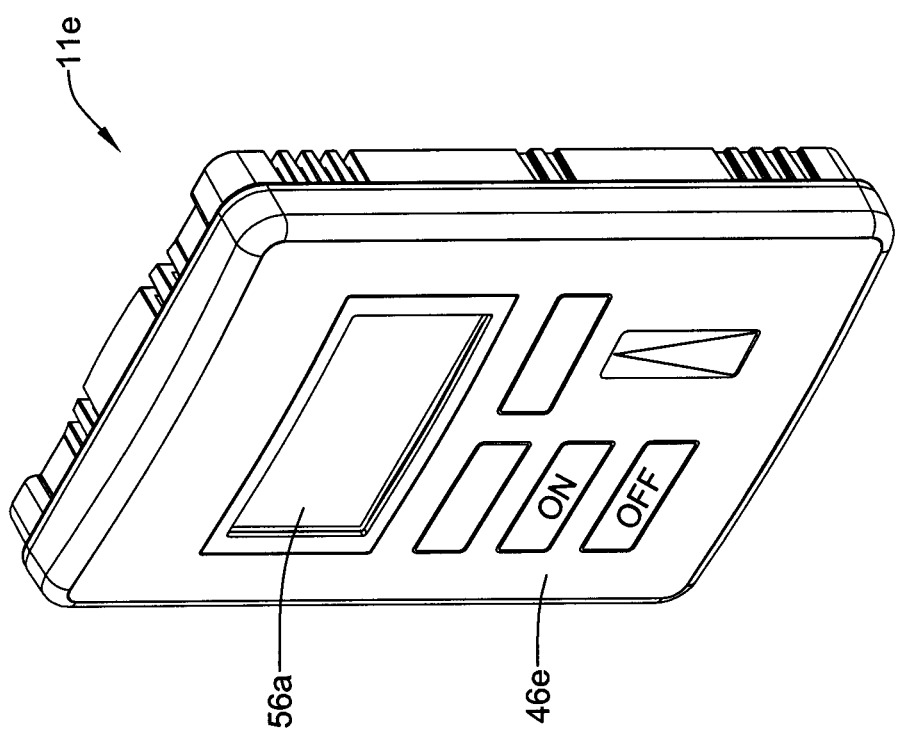
Figure 7G:
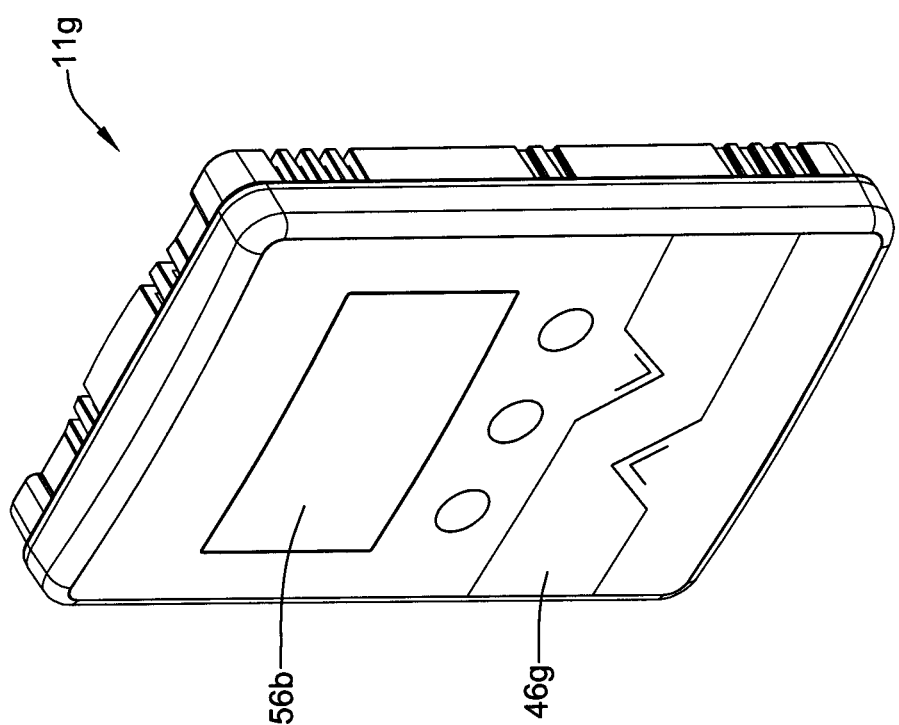

FIGS. 7A-7G provide illustrative examples of several wall modules 11A-11G, each wall module having a different user interface configuration 14A-14G that may be provided by selecting different combinations of overlays 46B-46G and displays 56A and 56B. As discussed herein, the overlay 46, the configuration of the overlay 46, and the size and/or shape of the display 56 may be selected according to the desired end use application of the individual wall modules 7A-7G. In some cases, as shown in FIG. 7A, the wall module 11 may include only a display 56 in which case an overlay 46 may not be necessary. However, it is contemplated that in this example, a protective overlay 46 may be provided. It is contemplated that different wall modules performing different functions within the same building may be provided with different overlays 46 depending upon the function of the individual wall module 11 while at the same time maintaining the same overall look and design for all the wall modules 11, which some users may find more aesthetically pleasing. Moreover, in some cases, the various overlays, displays and sensor modules may be selected and assembled in the field, which may allow far fewer different configurations that must be manufactured and stored in warehouses.

Figure 8:
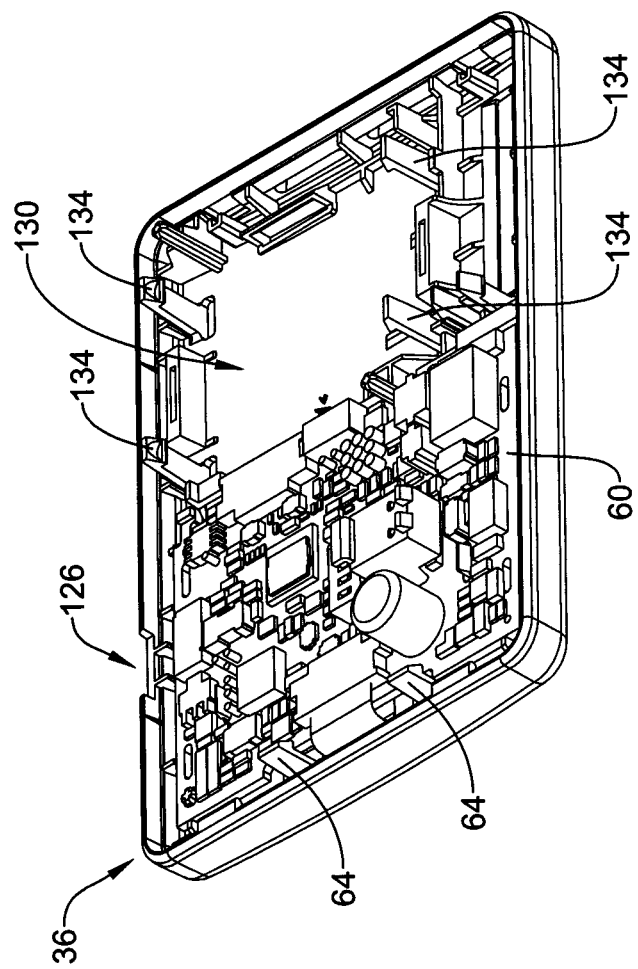
FIG. 8 is a perspective view of an illustrative housing cover with a main circuit board attached.

As discussed herein, a selected overlay 46 may be applied and secured to an outer surface 30 of the housing cover 36 to form at least part of the user interface 14 of an individual wall module 11. FIG. 8 is a perspective view of the housing cover 36 shown in FIG. 2. As shown in FIG. 8, the housing cover 36 may include at least a first segment 126 and a second segment 130. The first segment 126 may be configured to receive the main circuit board 60. As discussed above with reference to FIG. 2, a display 56 may be coupled to a front side 74 of the main circuit board in which case, the first segment 126 may include a window 52 having dimensions generally corresponding to the dimensions of the display 56 (e.g. slightly smaller that the dimensions of the display 56). Additionally, the first segment 126 may include one or more locking tabs 64 for securing the main circuit board 60, including the display 56, to the housing cover 36 in a snap-fit manner. As shown in FIG. 8, a main circuit board 60 is received in the first segment 126 and secured within the housing cover via the locking tabs 64.

In some cases, the second segment 130 may be sized and configured to receive an expansion module (not shown) therein. In many cases, as will be described in greater detail below, the expansion module may be sensor expansion module including at least one sensor or some combination of sensors. Like the first segment 126, discussed herein, the second segment 130 may include one or more locking features such as, for example, locking tabs 134 to secure the expansion module to the housing cover 36 in a snap-fit manner. Depending upon the size and/or end use application of the wall module 11, the housing cover 36 may include additional segments for receiving additional expansion modules as necessary or desired. The additional expansion modules may include one or more additional sensors, signal conditioning circuitry, communication circuitry, additional memory, battery power module, a wireless communication module, a wired communication module, and/or the like.

Figure 9:
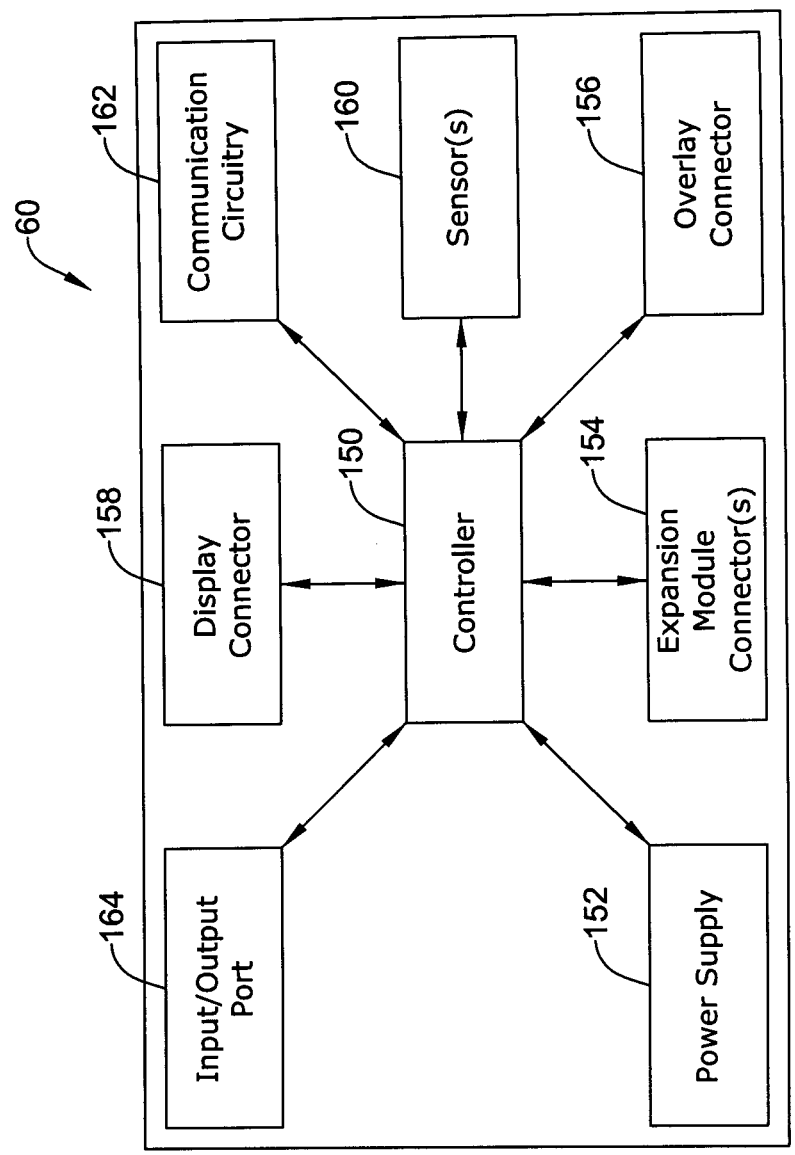
FIG. 9 is a schematic block diagram of an illustrative main circuit board.

FIG. 9 is a schematic block diagram of a main circuit board 60 that may be received in the first segment 126 of the housing cover 36. As shown in FIG. 9, the main circuit board can include, for example, a controller 150 (e.g. microprocessor, microcontroller, and/or other circuitry) coupled to a power supply 152, an expansion module connector 154, an overlay connector 156, a display connector 158, one or more on-board sensors 160, communication circuitry 162, and an input/output port 164. In some cases, the main circuit board 60 may optionally include a separate memory and/or a port for receiving a flash memory drive. When the illustrative wall module 11 is fully assembled, an expansion module may be electrically connected to the main circuit board 60 via the expansion module connector 154 such that the components of the expansion module may be in operative communication with and, in some cases, controlled by the controller 150. Depending upon the application, the main circuit board 60 may include additional expansion module connectors for electrically connecting additional expansion modules. The particular overlay 46 selected to form at least a portion of the user interface 14 of the wall module 11 may be coupled to the main circuit board via the overlay connector 156.

In some cases, the main circuit board 60 may include one or more on-board sensors 160. The one or more on-board sensors 160 may include any one of an on-board temperature sensor and/or humidity sensor, but not limited to these. The sensor(s) 160 may be activated for sensing by the manufacturer or by an installer at the time of installation of the wall module in a building depending upon the desired end use application of the individual wall module 11.

In some cases, the controller 150 may be programmed to recognize a configuration of a selected overlay 46 upon connection of the overlay 46 to the main circuit board 60. Upon recognizing the selected overlay 46, the controller 150 may be programmed to configure one or more screens that may be displayed to a user via the display 56 of the user interface 14 accordingly. The controller 150 may also be programmed to configure the functionality of the one or more keys of the selected overlay 46. In other cases, a configuration tool 13, such as described herein, may be used to configure one or more screens for display via the display 56 and/or the functionality of one or more keys 28 provided on the overlay 46. In still other cases, the controller 150 may be programmed to recognize certain features of a selected overlay 46 upon connection of the selected overlay 46 to the main circuit board 60.

A configuration tool 13 may be then used to configure the remaining features of the overlay 46 and the display 56 applicable to the desired end use application. Similarly, the controller 150 may be programmed to recognize the components of an expansion module upon connection of the expansion module to the main circuit board 60 via the expansion module connector 154.

Figure 10:
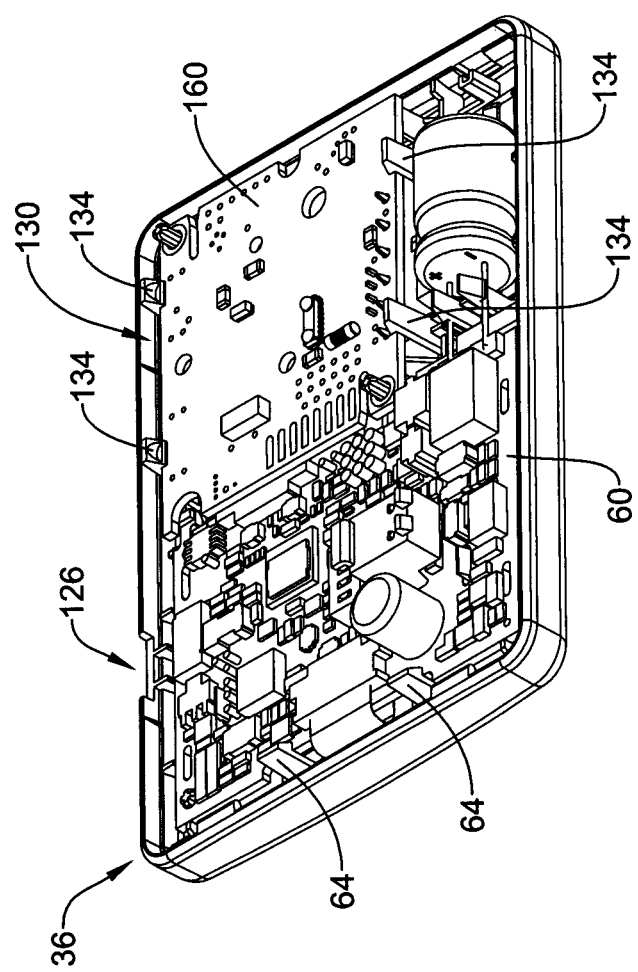
FIG. 10 is a perspective view of the illustrative housing cover of FIG. 8 with an expansion module.

FIG. 10 is a perspective view of the housing cover 36 including a main circuit board 60, as described herein, and an expansion module 160. As can be seen in FIG. 10, the expansion module 160 may be received in the second segment 130 of the housing cover 36. The expansion module 160 may be secured to the second segment 130 of the housing cover 36 in a snap-fit manner using one or more locking tabs 134. The expansion module 160 may be electrically connected to the main circuit board 60 via the expansion module connector 154 provided on the main circuit board 60 such that it is communication with and, in some cases, controlled by the controller 150.

Figure 11:
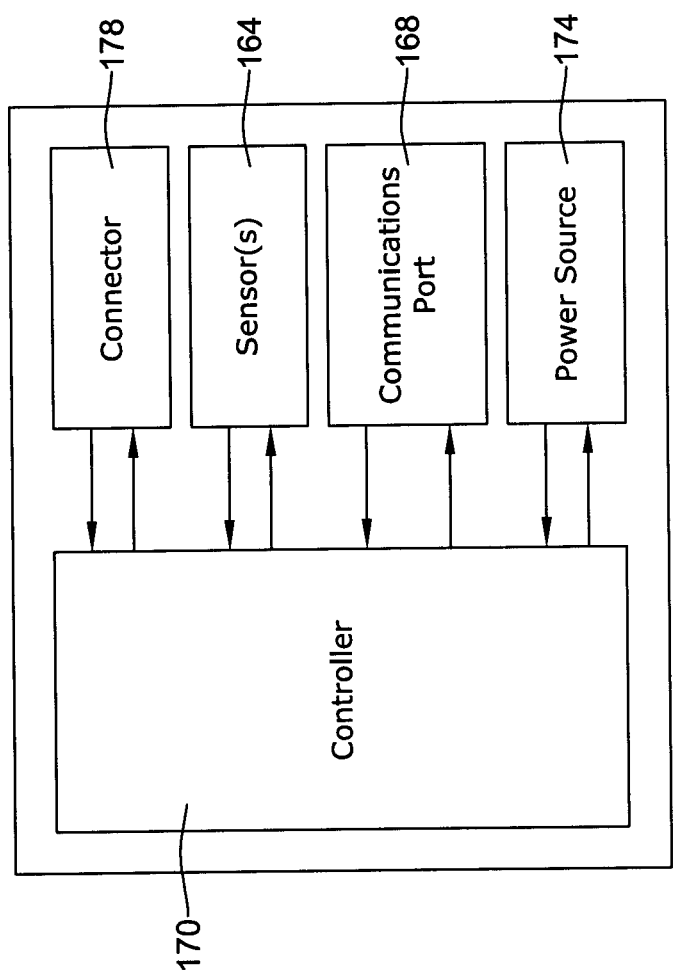
FIG. 11 is a schematic block diagram of an illustrative expansion module.

FIG. 11 is a schematic block diagram of an illustrative expansion module 160. In some cases, the expansion module 160 may include one or more sensors for detecting a measure indicative of an environmental parameter. The one or more sensors may include, but are not limited to, a temperature sensor, a humidity sensor, a $CO_2$, a CO sensor, and/or combinations thereof. In addition, the one or more sensors may include a light sensor, a motion sensor, a smoke sensor, a noise sensor, and/or any other suitable sensor as desired. Depending upon the desired end use application, the expansion module 160 may be selected such that is has a desired sensing capability and may, in some cases, include a combination of sensor types. For example, the expansion module 160 may be selected such that includes a temperature sensor, a humidity sensor and a $CO_2$ sensor. In another example, wherein the temperature sensor and/or humidity sensor are provided on the main circuit board, the expansion module 160 may be selected such that includes a $CO_2$ sensor, a CO sensor and a motion sensor to expand the sensing capabilities of the expansion module. Because the expansion module 160 may have a uniform shape and size, an expansion module 160 may be selected from a plurality of expansion modules, each expansion module having a different functionality such that different expansion modules 160 may be interchangeable. The selected expansion module 160 having the desired sensing capabilities may be secured in the second segment 130 of the housing cover 36 using the one or more locking tabs 134 to provide an individual wall module 11 with a desired functionality.

Additionally, the expansion module 160 may optionally include a communications port 168 for communicating with other wall modules 11 and/or the building controller 17, as shown in FIG. 1. The communications port 168 may be provided in addition to or instead of the one or more sensors, as described herein. In examples where the wall module 11 may include a first expansion module and a second expansion module, the first expansion module may include one or more sensors providing additional or expanded sensing capabilities and the second expansion module may include a communications port 168 for facilitating communication with one wall modules 11 and/or the building controller 17. In some cases, the communications port 168 may include any one of a Blue Tooth communications port, a WiFi communications port, a cellular (e.g. 3G or 4G) communications port, and/or any other suitable communications port 168 that may facilitate communication between the wall module 11 and another device. While the different communications ports 168 described herein are wireless communications ports, it will be generally understood that the communications port may facilitate wired communication between the wall module 11 and at least one other device.

As shown in FIG. 11, the one or more sensors and/or the communication port 168 may be coupled to and in communication with a controller 170 (e.g. microprocessor, microcontroller, etc.) provided on the expansion module 160. The controller 170 may include its own logic for carrying out a variety of functions. In addition, and in some cases, the expansion module 160 may include a power source 174 and a connector 178. The connector 178 may be any suitable connector for facilitating connection of the expansion module 160 to the main circuit board 60. In some cases, the expansion module 160 may also include a memory and suitable signal conditioning circuitry (e.g. filters, amplifiers, A/D converters, etc.) for conditioning a signal indicative of a sensed environmental parameter. In some cases, the expansion module may include minimal supporting hardware, and instead may rely on the processing, power, and/or storage capabilities of the main circuit board 60.

In some cases, the controller 150 may be programmed to recognize the components of the expansion module 160 upon connection of the expansion module 160 to the main circuit board 60 via the expansion module connector 154 and the connector 178. For example, the controller 150 of the main circuit board 60 may be programmed to detect the number and type of sensors and/or the presence and type of communications port 168. Upon detecting the different components of the expansion module 160, the controller 150 may be programmed to configure one or more screens that may be displayed on the display 56 of the wall module 11 accordingly. For example, the controller 150 may be programmed to display a $CO_2$ level on at least one screen that may be displayed to a user via the display 56 upon detection of a $CO_2$ sensor included within the expansion module 160. In another example, the controller 150 may be programmed to display a humidity level on at least one screen that may be displayed to a user via the display 56 upon detection of a humidity sensor included within the expansion module 160. In still another example, the controller 150 may be programmed to display or trigger an alarm upon detection of a CO level that exceeds a predetermined threshold upon detection of a CO sensor included within the expansion module. These are just some examples.

In some cases, a configuration tool 13 may be used to configure the controller 150 such that it communicates with and/or displays information relevant to the different components of the expansion module 160 as necessary or desired. Alternatively, or in addition, the controller 170 of the expansion module may be configured to upload a program module from a memory of the expansion module 160 to the controller 150 of the main circuit board 60 upon connection of the expansion module 160 to the main circuit board 60. Upon receiving the program module from the controller 170 of the expansion module 160, the controller 150 may be programmed to configure the functionalities of the wall module 11 and/or alter one or more screens that may be displayed via the display of the wall module 11 to reflect the functionalities of the components included within the expansion module 160.

Figure 12:
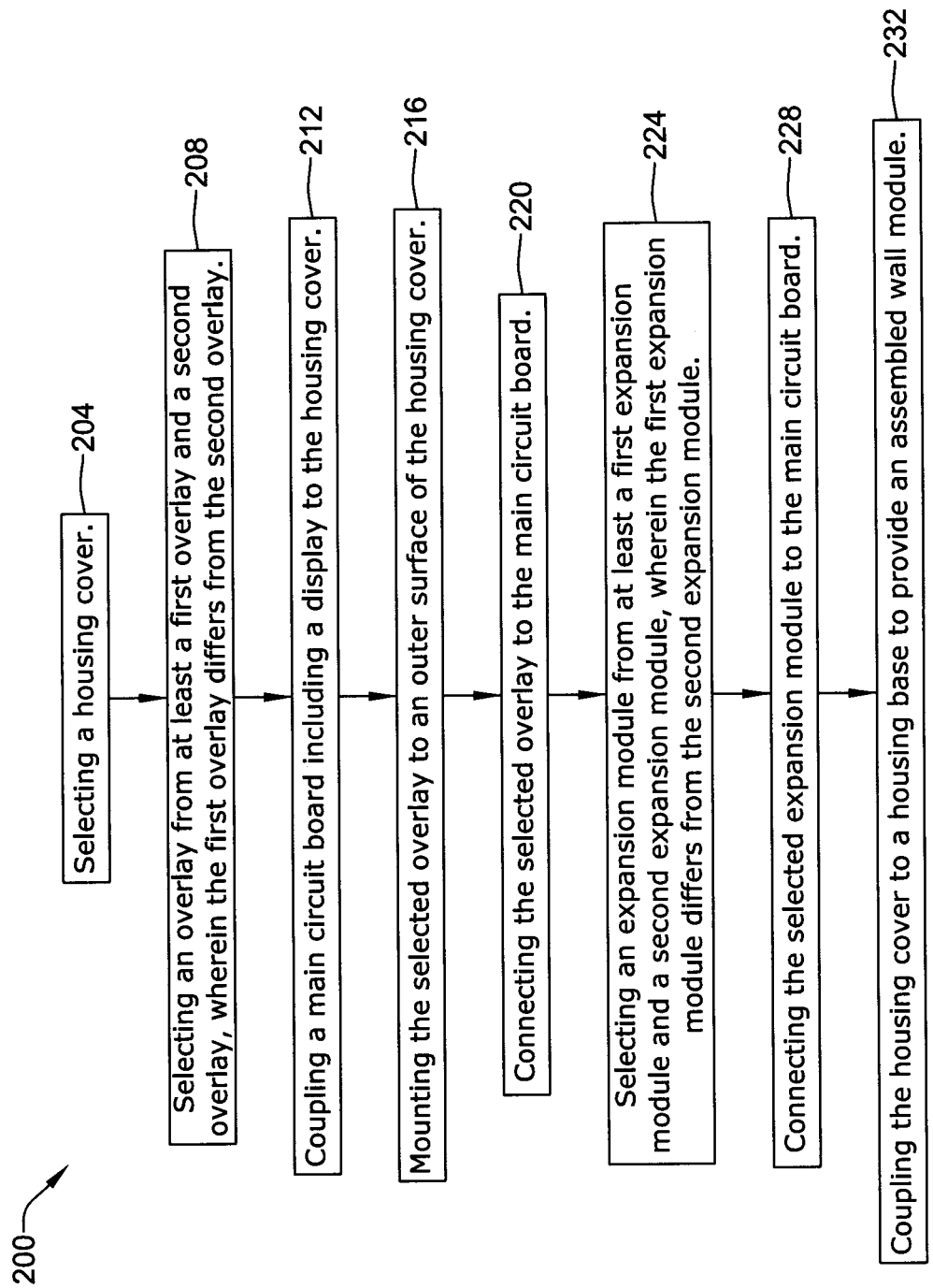
FIG. 12 is a flow diagram showing an illustrative method of assembling a wall module.

FIG. 12 is a flow diagram showing an illustrative method 200 of assembling an wall module 11. According to the illustrative method, an appropriate housing cover 36 may be selected according to the desired display capabilities of the individual wall module 11 (Block 204). For example, a housing cover 36 may be selected such that it includes a window or opening 54 having a size and shape corresponding to a size and shape of a selected display. Depending upon the desired end use application and the desired features of the user interface 14, an overlay 46 may be selected from two or more available overlays 46, each overlay 46 having a different configuration (208). The overlay 46 may be selected according to, for example, the desired number and/or type of touch sensitive keys 78 and/or whether or not the overly has an opening 52 sized to accommodate the opening 54 in the housing cover 36 and the selected display 56. The selected display 56 may be coupled to the main circuit board 60, and the main circuit board 60 may be snap-fit into an appropriate segment of the housing cover (212). The overlay 46 may then be mounted and secured to an outer surface 30 of the housing cover 36 and connected to the main circuit board 60 (Blocks 216 and 220). Next, an expansion module 160 having one or more desired sensing and/or communication functionalities may be selected according to the desired end use application of the individual wall module (Block 224). The expansion module 160 may be selected from a plurality of expansion modules that may be available for selection, each having a different functionality and being similarly sized and shaped such that the selected expansion module 160 may be snap-fit into another segment of the housing. In many cases, the expansion module 160 may include at least one sensor. The selected expansion module 160 may then be coupled to the main circuit board (Block 228). The housing cover 36 including the overlay, the display, the main circuit board, and the expansion module may then be secured to a housing base to provide the assembled wall module (232). It is contemplated that this illustrative method may be performed in the factory or in the field.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed

What is claimed is:

1. A wall module configured to communicate with a building controller for controlling one or more components of an HVAC system, the wall module comprising:
   a housing including a cover and a base;
   a port for communicating control signals to one or more components of an HVAC system;
   a memory;
   a user interface comprising an overlay secured to the cover of the housing, the overlay comprising an overlay configuration including one or more touch sensitive regions for accepting an input from a user;
   a controller disposed within the housing and operatively coupled to the port, the memory, and the user interface, wherein the controller is configured to detect an overlay configuration of the user interface from two or more different overlay configurations and to change the controller's behavior based on the detected overlay configuration; and
   a removable sensor module that include a sensor, wherein the controller is configured to detect a sensor configuration of the sensor module from two or more different sensor configurations, and to change the controller's behavior based on the detected sensor configuration.

2. The wall module of claim 1, wherein the wall module further comprises:
   a display; and
   the controller alters information displayed on the display based, at least in part, on the detected overlay configuration and the detected sensor configuration.

3. The wall module of claim 2, wherein the cover includes a window exposing at least part of the display.

4. The wall module of claim 3, wherein the overlay further comprises an opening that is in registration with the window in the cover.

5. The wall module of claim 1, wherein the overlay is a multi-layered overlay comprising at least an adhesive layer and an overlay layer, wherein the overlay layer includes one or more touch-sensitive regions.

6. The wall module of claim 5, wherein the one or more touch-sensitive regions include one or more capacitive touch regions.

7. The wall module of claim 5, wherein the one or more touch-sensitive regions include one or more tactile switches.

8. The wall module of claim 1, wherein the one or more touch sensitive regions include a button, a slider bar and/or a dial.

9. The wall module of claim 1, wherein each of the one or more touch sensitive regions are identified to a user by a mark visible on the overlay.

10. The wall module of claim 1, further comprising a temperature sensor, wherein the temperature sensor is separate from the sensor module.

11. The wall module of claim 1, further comprising a humidity sensor, wherein the humidity sensor is separate from the sensor module.

12. The wall module of claim 1, wherein the sensor module comprises a $CO_2$ sensor.

13. The wall module of claim 1, wherein the sensor module comprises two or more sensors, including a $CO_2$ sensor.

14. The wall module of claim 1, wherein the sensor module includes one or more of a $CO_2$ sensor, a CO sensor, an Oxygen Sensor, a natural gas detector, a particulate matter detector, a pollen detector, a humidity sensor, a temperature sensor, a lighting sensor, and a motion sensor.

15. The wall module of claim 1, wherein the sensor module further comprises a wireless input/output port for transmitting and/or receiving data.

16. The wall module of claim 1, further comprising at least one additional sensor module comprising at least one additional sensor.

17. A wall module comprising:
   a housing comprising a cover coupled to a base;
   a main circuit board disposed within the housing and coupled to the housing, the main circuit board comprising a controller, a memory, and a port;
   a display operatively coupled to the main circuit board and in communication with the controller;
   an overlay having an overlay configuration with one or more touch sensitive regions for accepting an input from a user, the overlay secured to an outer surface of the cover and communicatively coupled to the main circuit board;
   a removable sensor module disposed within the housing and communicatively coupled to the main circuit board, the sensor module having a sensor configuration; and
   wherein the controller is configured to detect the overlay configuration from two or more different overlay configurations and to detect the sensor configuration of the sensor module from two or more different sensor configurations, and to change the controllers behavior based on the detected overlay configuration and the detected sensor configuration.

18. The wall module of claim 17, comprising an adhesive adhering the overlay to the outer surface of the cover.

19. The wall module of claim 17, wherein the overlay is communicatively coupled to the main circuit board via a ribbon cable.

* * * * *